March 30, 1965    G. B. FORD ET AL    3,175,388
CONTROL APPARATUS

Filed Aug. 6, 1962    3 Sheets-Sheet 1

INVENTORS.
GAIL B. FORD
CARL E. JOHNSON
BY Roger W. Jensen
ATTORNEY

March 30, 1965  G. B. FORD ET AL  3,175,388
CONTROL APPARATUS
Filed Aug. 6, 1962  3 Sheets-Sheet 2
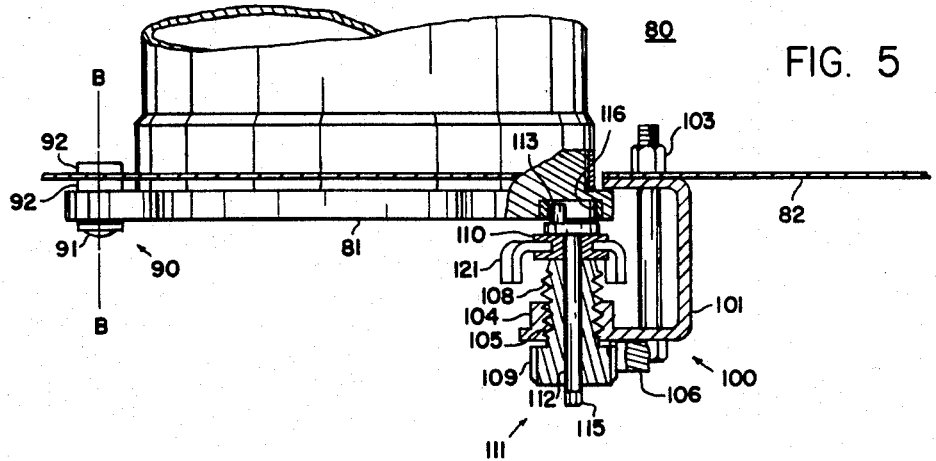
FIG. 5
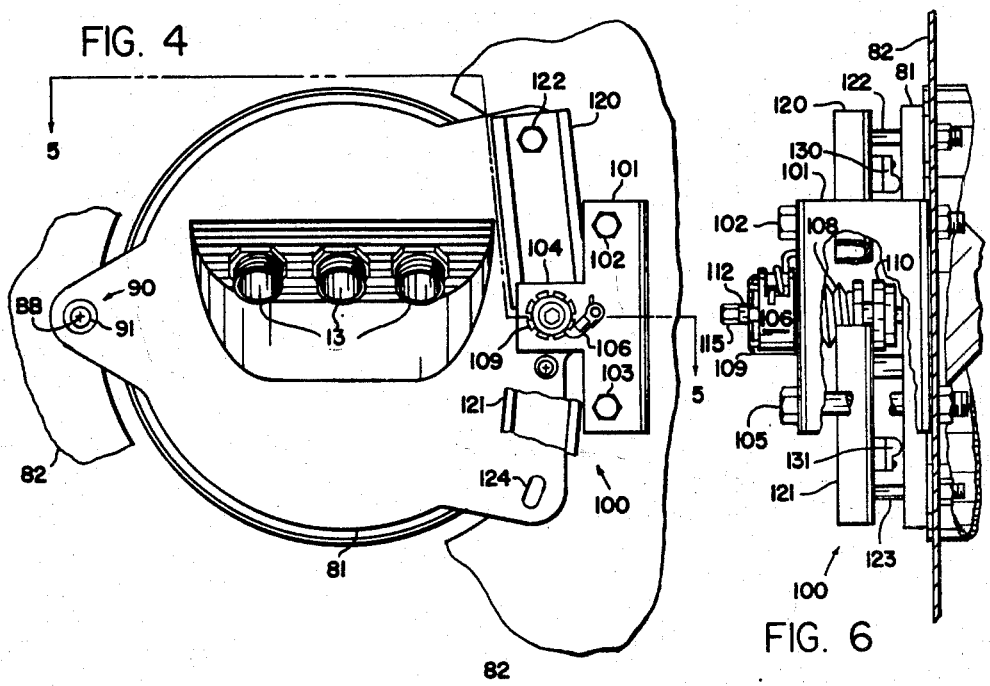
FIG. 4
FIG. 6
INVENTORS.
GAIL B. FORD
CARL E. JOHNSON
BY
ATTORNEY

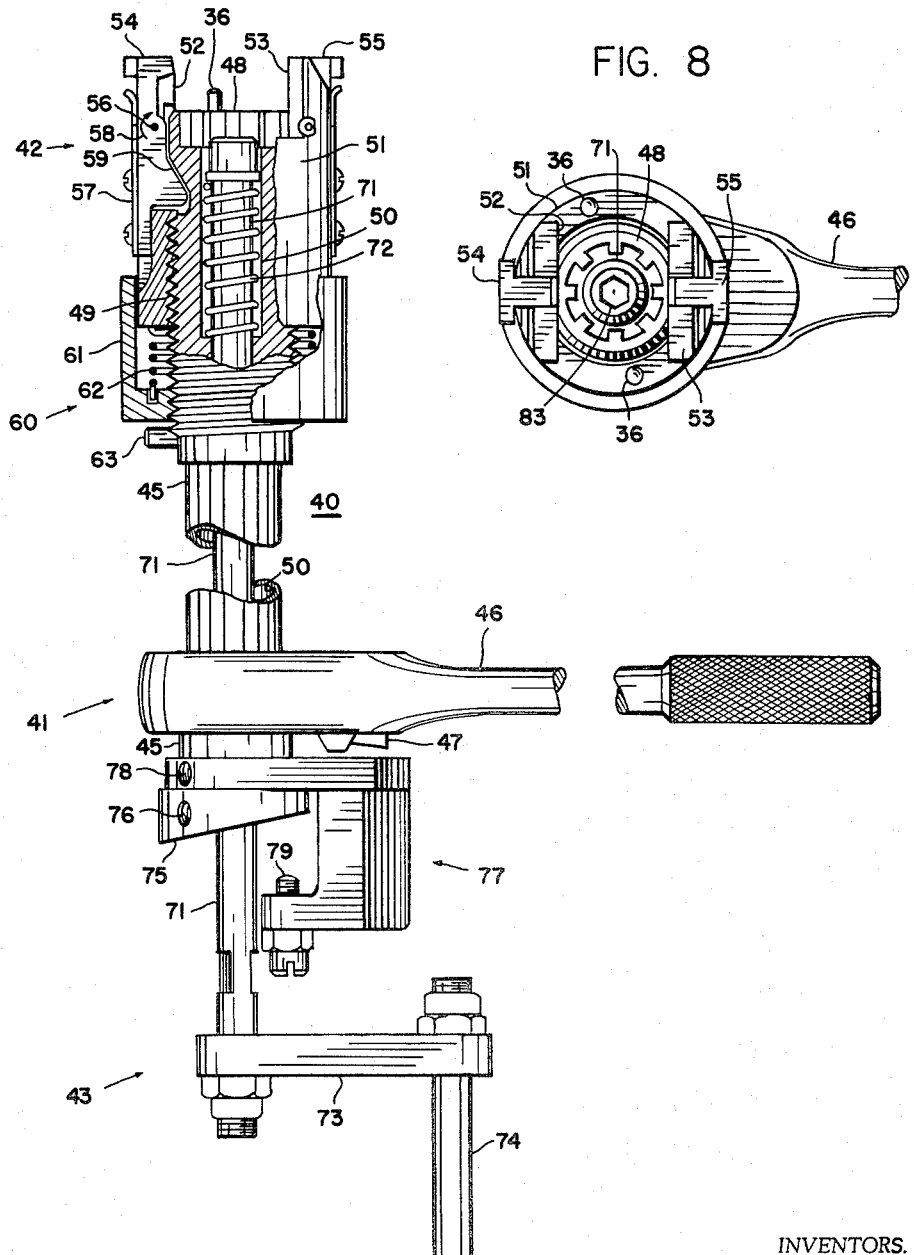

United States Patent Office 3,175,388
Patented Mar. 30, 1965

3,175,388
CONTROL APPARATUS
Gail B. Ford, Minneapolis, and Carl E. Johnson, Brooklyn Center, Minn., assignors to Honeywell Inc., a corporation of Delaware
Filed Aug. 6, 1962, Ser. No. 215,094
8 Claims. (Cl. 73—1)

This invention pertains to test apparatus and more particularly to mechanical test apparatus for rate sensors.

It is desirable in many applications to determine whether the control system of a craft is functioning properly before it is airborne. The present invention provides a means for mechanically applying an angular rate about the input axis of a rate sensor or rate sensors of a control system. By applying a rate input to the rate sensors, it is possible to check rate sensor performance and control system dynamic performance. A mechanical test apparatus is necessary because the errors inherent in the electrical testing apparatus presently available are greater than the allowable errors for the control system and rate sensors. The applicants' mechanical test apparatus comprises a unique mounting means for the rate sensor which coacts with a unique wrench means to provide a rate input about either of two perpendicular axes. The roll and pitch rate sensors utilize identical mounting means, however, a different embodiment is necessary for the yaw rate sensors because of the orientation of the rate sensors upon the vehicle. The same wrench means is utilized with each type of mounting means.

It is therefore an object of this invention to provide an improved control apparatus.

This and other objects of thie invention will become apparent from a study of the accompanying specification and claims in conjunction with the drawings in which:

FIGURE 4 is a plan view of the mounting means utilized for the yaw rate sensors;

FIGURE 5 is a partial sectional view taken along section lines 5—5 of FIGURE 5;

FIGURE 6 is a partial cutaway side view of the mounting means of FIGURE 4;

FIGURE 7 is a partial sectional view of the wrench means; and

FIGURE 8 is a top view of the wrench means of FIGURE 7.

Figure 1:
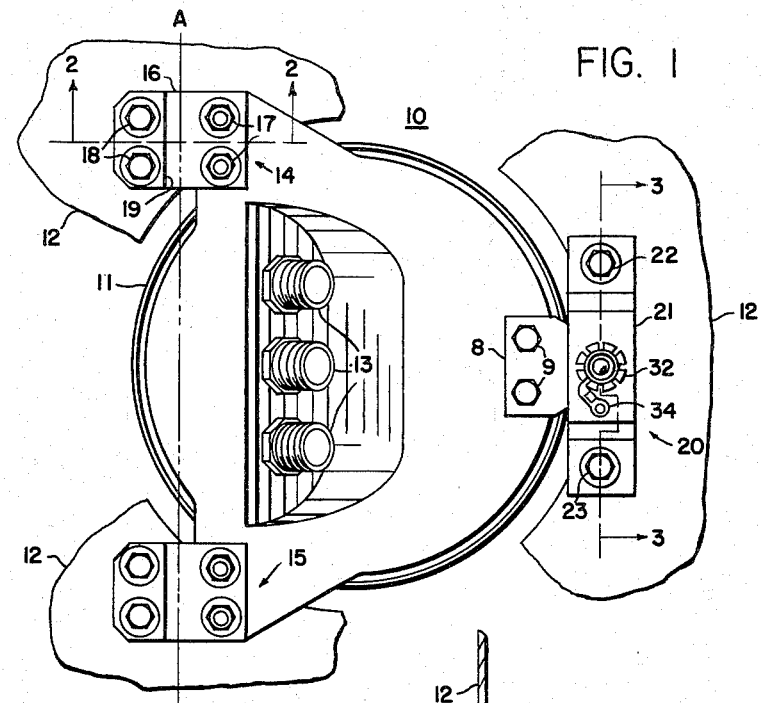
FIGURE 1 is a plan view of the mounting means utilized for the pitch and roll rate sensors.

Referring now to FIGURE 1, reference numeral 10 generally depicts a rate sensor package utilized to sense roll or pitch rates of a vehicle. That is, the input axis of the rate sensor lies in the plane of the drawing. Rate sensor package 10 comprises a cylindrically shaped rate sensor housing 11 which is mounted upon a base means 12. Rate sensor housing 11 includes a flange element 8 which is rigidly attached ot housing 11 by means of bolts 9. FIGURE 1 is a bottom view of the rate sensor package and the rate sensors per se are not illustrated, however, three rate sensor electrical connectors 13 are illustrated. One electrical connector is required for each rate sensor. It should be noted that the applicants' invention is applicable to a package containing a single rate sensor or a plurality of rate sensors.

Figure 2:
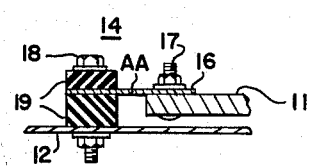
FIGURE 2 is a partial sectional view taken along section lines 2—2 of FIGURE 1.

The means for mounting rate sensor housing 11 upon base means 12 includes a first pivot means 14 and a second pivot means 15. Pivot means 14 and 15 are structurally identical so that only pivot means 14 need be discussed in detail. As more clearly illustrated in FIGURE 2, pivot means 14 comprises a resilient planar element 16 rigidly attached to rate sensor housing 11 by means of bolts 17. Resilient element 16 is rigidly attached to base means 12 by means of bolts 18. A heat insulator 19 is positioned on each side of resilient element 16 and held in position by bolts 18. Heat insulators 19 function to reduce the heat conduction from base means 12 to housing 11. Resilient element 16 pivots along an axis A—A intermediate heat insulators 19 and the end of rate sensor housing 11 when a force is applied to rate sensor housing 11 perpendicular to axis A—A. In the absence of an applied force about axis A—A, pivot means 14 and 15 do not allow relative movement between rate sensor housing 11 and base means 12. It should be noted that the applicant does not wish to be restricted to the type of pivot means illustrated in FIGURES 1 and 2; other mechanical equivalents may be substituted for pivot means 14 and 15.

Figure 3:
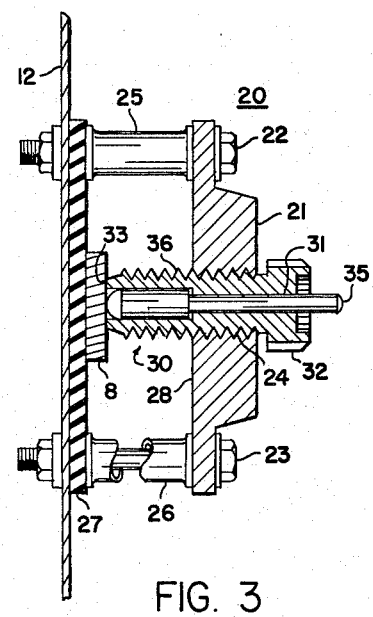
FIGURE 3 is a partial sectional view taken along section lines 3—3 of FIGURE 1.

The means for mounting rate sensor housing 11 upon base means 12 also includes a disabling means 20 which is best illustrated in FIGURE 3. FIGURE 3 is enlarged in scale relative to FIGURE 1 in order to more clearly illustrate the applicants' invention. Disabling means 20 comprises a rectangular bracket member 21 spaced apart from, but rigidly attached to base means 12 by bolts 22 and 23. Bracket 21 is spaced apart from base means 12 by means of spacer elements 25 and 26 which are held in position by bolts 22 and 23 respectively. A heat insulator 27 is positioned between base means 12 and spacer elements 25, 26 and is held in position by bolts 22 and 23. The heat insulator 27 functions to decrease the heat conduction from base means 12 to the housing 11. Bracket member 21 has a centrally located threaded aperture 24 therethrough. A securing shaft 30 having an axial bore 31 therethrough is provided. Securing shaft 30 has a spline 32 located upon one end thereof and the opposite end has a flat bearing surface 33 thereon. Bearing surface 33 abuts flange element 8 of housing 11 in FIGURE 3. The intermediate portion of shaft 30 is threaded as at 36. Threaded portion 36 of shaft 30 is positioned within, and threadably engaged with aperture 24 of bracket 21. Rotation of shaft 30 results in the shaft being axially displaced relative to the bracket 21. A dog element 34 is provided upon bracket 21 and biased so as to normally prevent shaft 30 from rotating. An elongated dowel element 35 is slidably positioned within bore 31 of shaft 30. Dowel element 35 has a greater axial extent than shaft 30 and extends axially beyond the spline end of the shaft 30. The function of dowel element 35 will be discussed hereinafter.

Disabling means 20 has a first condition and a second condition. Disabling means 20 is illustrated in the first condition in FIGURE 3, that is, shaft 30 is abutting flange 8 of housing 11 and holding it against heat insulator 27. In this first condition, no relative movement is possible between housing 11 and base means 12. In the second condition, shaft 30 is axially displaced to the right, as viewed in FIGURE 3, so as to allow flange element 8 and housing 11 to be displaced relative to base 12. In this second condition housing 11 may be displaced or oscillated approximately 6 degrees about axis A—A.

FIGURES 7 and 8 illustrate a wrench means 40 which coacts with disabling means 20 so as to place disabling means 20 in a first or a second condition. With reference to FIGURE 7, wrench means 40 comprises three major components: ratchet means 41, captive means 42, and crank means 43, which are connected together by a hollow shaft 45 having a bore 50 therethrough.

Ratchet means 41 comprises a ratchet handle 46 which is rigidly attached to and perpendicular with hollow shaft 45. A switching means 47 is provided upon ratchet handle 46 to change the direction of the ratchet drive. Ratchet handle 46 is attached to hollow shaft 45 near one end thereof. The opposite end of hollow shaft 45 defines an internal spline 48 which is more clearly illustrated in FIGURE 8. Shaft 45 includes a threaded portion, as at 49, between spline 48 and ratchet handle 46.

Crank means 43 comprises an elongated shaft 71 which is concentrically positioned within bore 50 of hollow shaft 45. Shaft 71 has a greater axial extent than shaft 45 and extends from the spline end of shaft 45 to a point axially beyond the other end of shaft 45. The end of shaft 71 contiguous the spline end of shaft 45 has a hexagonal opening 83 therein. A spring means 72 having a short axial extent is positioned within bore 50 of hollow shaft 45 and surrounds shaft 71. Spring means 72 acts against a collar upon shaft 71 and against a shoulder of bore 50 so as to bias shaft 71 in the position illustrated in FIGURE 7. A lever 73 is rigidly attached to and perpendicular with the end of shaft 71 extending axially beyond ratchet handle 46. A handle 74 is rigidly attached to and perpendicular with lever 73 so that handle 74 and shaft 71 are substantially parallel. Shaft 71, lever 73, and handle 74 cooperate so as to define a crank configuration. Rotation of handle 74 about an axis defined by shaft 71 results in rotation of shaft 71.

A cam element 75 is rigidly attached to shaft 71 by means of set screw 76. A cam follower assembly 77 including a follower 79 is rigidly attached to shaft 45 by means of set screw 78. Follower 79 will not engage cam element 75 when shaft 71 is in the position relative to shaft 45 as illustrated in FIGURE 7. When cam 75 and follower 79 are not in engagement, rotation of crank means 43 will result in rotation only of shaft 71. However, when wrench means 40 is connected to disabling means 20, dowel element 35 will overcome the bias of spring 72 and displace shaft 71 relative to shaft 45 so that cam 75 engages follower 79. It is clear that rotation of crank means 43, when cam 75 engages follower 79, will result in an axial or reciprocating motion of shaft 71 in addition to rotation thereof.

Captive means 42 comprises a hollow cylindrical element 51 having a relatively short axial extent. Element 51 is threadably engaged with threaded portion 49 of shaft 45. The thread pitch of element 51 and shaft 45 is the same as the thread pitch of shaft 30. Cylindrical element 51 has two diametrically opposite arcuate sections or feet 52 and 53 extending from one end thereof and extending axially beyond the spline end of shaft 45. Two locking members 54 and 55 are pivotally attached to feet 52 and 53 respectively. Locking member 54 is pivotally attached to foot 52 at point 56. Locking member 54 is biased in the position illustrated in FIGURE 7 by a spring element 57 which is rigidly attached thereto and acts against foot 52. Locking member 55 is structurally identical to locking member 54.

It will be noted that element 51 of captive means 42 is threadably engaged with threaded portion 49 of shaft 45 and is axially movable with respect thereto. A stop means 60 is provided to limit the axial movement of element 51 along threaded portion 49 of shaft 45. Stop means 60 comprises a hollow cup-shaped element 61 which is threadably engaged with threaded portion 49 of shaft 45. The bottom of cup-shaped element 61 is axially spaced apart from the end of element 51. A spring element 62 is positioned in the axial space between elements 51 and 61 with one end attached to element 51 and the other end to element 61. A stop peg 63 is rigidly attached to, and perpendicular with shaft 45. Rotation of element 51 relative to shaft 45 results in element 51 being axially displaced along shaft 45 toward stop means 60. Rotation of element 51 results in element 61 being rotated relative to and axially displaced with respect to shaft 45 until it reaches stop peg 63. At this point element 61 is prevented from being axially displaced relative to shaft 45 and further rotation of element 51 will be opposed by spring means 62.

Thus stop means 60 functions to limit the axial travel of element 51 relative to shaft 45. The axial position of element 51 relative to shaft 45 is important in functioning of captive means 42 and will be fully discussed hereinafter.

In operation, wrench assembly 40 is connected to disabling means 20 of the means mounting rate sensor housing 11 to base means 12. Feet 52 and 53 of wrench assembly 40 are positioned so as to straddle bracket means 21 of disabling means 20. Spline element 48 of wrench assembly 40 engages spline element 32 of shaft 30. Dowel 35 also engages hexagonal opening 83 in the end of shaft 71 and overcomes the bias of spring 72 so as to displace shaft 71 relative to shaft 45 and cause cam 75 to engage follower 79. Either one of two pegs 36 located on the end of shaft 45 forces spring biased dog 34 out of engagement with spline 32 so as to permit rotation thereof. It will be noted that feet 52 and 53 of element 51 straddle bracket 21 and prevent rotation between element 51 and bracket 21. However, rotation of ratchet handle 46 results in rotation of shaft 45. Consequently, there is relative rotation between shaft 45 and element 51 which results in element 51 being axially displaced relative to shaft 45 in a direction away from handle 46. As shaft 51 is axially displaced relative to shaft 45, locking member 54 engages shaft 45, as at 59, and is forced to pivot in a direction indicated by arrow 58 in FIGURE 7. The lip of locking member 54 is thus positioned on the underside 28 of bracket means 21 of disabling means 20. Locking member 55 functions in a similar manner.

Continued rotation of ratchet handle 46 causes rotation of spline 48 of shaft 45 and consequently, rotation of spline 32 of shaft 30. Rotation of shaft 30 results in shaft 30 being axially displaced relative to bracket 21 in a direction away from flange 8 of housing 11 as viewed in FIGURE 3. It should be noted that element 51 is axially displaced relative to shaft 45 as ratchet handle 46 is rotated so as to allow shaft 30 to be displaced relative to bracket 21 and flange 8 of housing 11. Stated otherwise, locking means 54 and 55 of captive means 42 hold element 51 fixed with respect to bracket 21 and housing 11 so that shaft 45, which is in engagement with shaft 30 through spline 48 and spline 32, must be axially displaced relative to bracket 21 to allow shaft 30 to be axially displaced relative to bracket 21 and housing 11. Ratchet handle 46 is rotated until axial displacement of element 51 is stopped by stop means 60. At this point shaft 30 is fully displaced from flange 8 of housing 11 and disabling means 20 is in a second condition. In this second condition flange 8 and housing 11 are free to move relative to base means 12. As previously indicated, dowel 35 has axially displaced shaft 71 relative to shaft 45 so that cam 75 is in engagement with follower 79. Manual rotation of handle 74 of crank means 43 results in a reciprocating motion of shaft 71 which is transmitted to dowel 35 and consequently to flange 8 and housing 11. That is, because of the nature of pivoting means 14, 15 displacement of dowel 35 causes housing 11 to be subjected to a rate input or an oscillation about axis A—A. It should be noted that housing 11 is oriented with respect to the gravity vertical so that it is biased against surface 33 of shaft 30. Consequently, housing 11 can be subjected to an oscillation by applying a force to only one side thereof. The applicant does not wish to be limited to this orientation, it is within the scope of this invention to bias housing 11 against shaft 30 by suitable means. Housing 11 is displaced approximately 6° about axis A—A. The rate sensors within housing 11 are also subjected to this rate input. All rate sensors are subjected to an identical rate input. Monitoring the outputs of the rate sensors quickly discloses whether or not they are functioning properly.

It is important to note that when disabling means 20 is in the second condition (allowing relative movement between housing 11 and base means 12) wrench means 40 cannot be removed from disabling means 20. Captive means 42 makes it impossible to remove wrench means 40 from the disabling means 20 unless disabling means 20 is in a first condition. This prevents any possibility of removing wrench means 40 without rigidly attaching housing 11 to base means 12.

FIGURES 4, 5 and 6 disclose a rate sensor package 80 utilized to sense yaw rates of a vehicle. That is, the input axis of the rate sensor is perpendicular to the plane of the drawing. Rate sensor package 80 comprises a cylindrically shaped rate sensor housing 81 mounted upon a base means 82. FIGURE 4 is a bottom view of the rate sensor package so that the rate sensors per se are not illustrated; however, electrical connectors 83 of the rate sensors are illustrated. It should be noted that the applicants' invention is applicable to a package containing a single rate sensor or a plurality of rate sensors.

The means for mounting housing 81 upon base means 82 includes a pivot means 90. Pivot means 90 attaches housing 81 to a base means 82 by means of a shaft element 91 which permits housing 81 to rotate relative to base means 82 about an axis B—B. Pivot means 90 does not permit axial movement between housing 81 and means 82. A heat insulator 92 is positioned upon each side of base means 82 and held in position by shaft element 91. Heat insulators 92 reduce the heat conduction from base means 12 to housing 11.

Disabling means 100 comprises a bracket element 101 which is rigidly attached to base means 82 by bolts 102 and 103. As viewed in FIGURE 4, bracket element 101 is generally T-shaped with a leg portion 104 positioned intermediate bolts 102 and 103. As viewed in FIGURE 5, bracket element 101 is generally C-shaped in cross-section. Leg portion 104 of bracket 101 has a threaded aperture 105 therethrough. A hollow threaded shaft 108 having a bore therethrough is positioned within aperture 105 threadably engaging leg portion 104 of bracket 101. A dog element 106 is positioned upon bracket 101 and biased so as to normally prevent rotation of shaft 108. Shaft 108 has a spline 109 on one end and a holding fixture 110 rigidly attached to the opposite end. Holding fixture 110 comprises a cylindrical member having an annular groove therearound. An eccentric drive means 111 is provided which comprises an elongated shaft 112 positioned within the bore of shaft 108. Shaft 112 has a hexagonal portion 115 on one end which extends axially beyond the spline end of shaft 108. The other end of shaft 112 has a stub shaft 113 rigidly attached thereto which is eccentrically located with respect to shaft 112. Two channel brackets 120 and 121 are provided. One end of each of channel brackets 120 and 121 is positioned within the annular groove within holding fixture 110, as illustrated in FIGURE 6. The other end of brackets 120 and 121 are attached to base means 82 of bolts 122 and 123 respectively. It will be noted that bolts 122 and 123 extend through elongated openings 124 within housing 81 and rigidly attach brackets 120 and 121 to base means 82. Bracket 121 has a fulcrum element 131 thereon located between the ends of bracket 121. Fulcrum element 130 abuts housing 81 and acts as a pivot point for bracket 121. When the end of bracket 121 positioned in holding fixture 110 of shaft 108 is displaced relative to bracket 101 and housing 81, bracket 121 is forced to rotate about fulcrum element 131. Bracket 120 has a similar fulcrum element 130.

Disabling means 100 is illustrated in FIGURES 4, 5, and 6 in a first condition. In this first condition disabling means 100 prevents any relative movement between housing 81 and base means 82. Even though bolts 122 and 123 extend through elongated slots 124 in housing 81, the interaction of fulcrum elements 130 and 131, brackets 120, 121, and holding fixture 110 is effective to prevent any relative movement between base means 82 and housing 81.

In operation wrench means 40 is connected to disabling means 100 in a manner similar to that discussed with reference to disabling means 20. Spline 48 of wrench means 40 engages spline 109 of shaft 108. Hexagonal portion 115 of shaft 112 is positioned within hexagonal opening 83 within shaft 71. It will be noted that shaft 112 of disabling means 100 has a shorter axial extent than dowel element 35 of disabling means 20. Consequently, shaft 71 is not axially displaced relative to shaft 45 of wrench means 40 upon connection with disabling means 100 and cam 75 does not engage follower element 79. Rotation of ratchet handle 46 results in rotation only of shaft 71. Rotation of shaft 71 results in rotation of spline 48, spline 109 and shaft 108 relative to bracket 101. This relative rotaton of shaft 108 causes shaft 108 to be axially displaced relative to bracket 101. Consequently, holding fixture 110 is axially displaced relative to bracket 101 and housing 81. This causes brackets 120 and 121 to pivot about fulcrum elements 130 and 131 so that bolts 102 and 103 no longer hold housing 81 fixed relative to base means 82. When housing 81 may be displaced relative to base means 82, disabling means 100 is in a second condition. It will be noted that captive means 42 of wrench means 40 prevents removal of the wrench while disabling means 100 is in the second condition.

Manual rotation of crank means 43 of wrench means 40 results in rotation of shaft 71. Rotation of shaft 71 results in rotation of shaft 112 of eccentric driving means 111. Stub shaft 113 of eccentric means 111 coacts with a surface 116 upon housing 81 so as to oscillate housing 81 about axis B—B defined by pivoting means 90. Elongated slots 124 allow housing 81 to be oscillated approximately 6° about axis B—B. Thus, rate sensors mounted upon housing 81 are subjected to a rate input about axis B—B. The output of the rate sensors is monitored to determine whether or not they are functioning properly. It should be pointed out that wrench means 40 is subjecting yaw rate sensor housing 81 to an oscillation about an axis B—B which is perpendicular with respect to the axis A—A about which the roll and pitch rate sensor housing 11 was oscillated.

The applicant has provided a unique test apparatus in which the means for mounting the rate sensor housing upon a base means coacts with a wrench means so as to oscillate the housing relative to the base means about either of two perpendicular axes. The rate sensors' output is monitored to determine whether or not the rate sensors are operating properly.

While we have shown and described a specific embodiment of this invention, further modifications or improvements will occur to those skilled in the art. We desire to be understood, therefore, that this invention is not limited to the particular form shown and we intend in the appended claims to cover all modifications which do not depart from the spirit and scope of this invention.

We claim as our invention:

1. In apparatus of the class described:

housing means;

base means;

means for mounting said housing means upon said base means, said mounting means including pivot means and disabling means, said pivot means defining an axis, said disabling means having a first condition and a second condition, said disabling means being effective in said first condition to maintain said housing means and said base means in a fixed relationship, said disabling means being effective in said second condition to allow relative movement between said housing means and said base means;

and wrench means, said wrench means including ratchet means, captive means, and crank means, said ratchet means being effective to place said disabling means in said second condition, said captive means being effective to prevent removal of said wrench means while said disabling means is in said second condition, and said crank means being effective to oscillate said housing means about said axis when said disabling means is in said second condition.

2. In apparatus of the class described:
housing means;
base means;
means for mounting said housing means upon said base means, said mounting means including pivot means and disabling means, said pivot means defining an axis, said disabling means having a first condition and a second condition, said disabling means being effective in said first condition to maintain said housing means and said base in a fixed relationship, said disabling means being effective in said second condition to allow relative movement between said housing means and said base means;
and wrench means, said wrench means including ratchet means and crank means, said ratchet means being effective to place said disabling means in said second condition, and said crank means being effective to oscillate said housing means about said axis when said disabling means is in said second condition.

3. In apparatus of the class described:
housing means;
base means;
means for mounting said housing means upon said base means, said mounting means including pivot means and disabling means, said pivot means defining an axis, said disabling means being effective in a first condition to maintain said housing means and said base means in a fixed relationship, said disabling means being effective in a second condition to allow relative movement between said housing means and said base means;
and wrench means, said wrench means including crank means, said wrench means being effective to place said disabling means in said second condition, said crank means being effective to oscillate said housing means about said axis when said disabling means is in said second condition.

4. In apparatus of the class described:
housing means;
base means;
means for mounting said housing means upon said base means, said mounting means including pivot means and disabling means, said pivot means defining an axis, said disabling means being effective in a first condition to maintain said housing means and said base means in a fixed relationship, said disabling means being effective in a second condition to allow relative movement between said housing means and said base means;
and wrench means, said wrench means being effective to place said disabling means in said second condition and to oscillate said housing means about said axis.

5. In apparatus of the class described:
housing means;
base means;
means for mounting said housing means upon said base means, said mounting means including first and second pivoting elements and disabling means, said pivoting elements defining an axis, said disabling means being effective in a first condition to maintain said housing means and said base means in a fixed relationship, said disabling means being effective in a second condition to allow relative movement between said housing means and said base means;
and wrench means, said wrench means being effective to place said disabling means in said second condition and to oscillate said housing means about said axis.

6. In apparatus of the class described:
housing means;
base means;
means for mounting said housing means upon said base means, said mounting means including a pivot element and disabling means, said pivot element defining an axis, said disabling means being effective in a first condition to maintain said housing means and said base means in a fixed relationship, said disabling means being effective in a second condition to allow relative movement between said housing means and said base means;
and wrench means, said wrench means being effective to position said disabling means in said second condition and to oscillate said housing means about said axis.

7. In apparatus of the class described:
housing means;
base means;
means for mounting said housing means upon said base means, said mounting means normally being effective to maintain said housing means and said base means in a fixed relationship;
and wrench means, said wrench means being effective to condition said mounting means so as to permit relative movement between said housing means and said base means and to apply an oscillation to said housing means relative to said base means.

8. In apparatus of the class described:
housing means;
base means;
means for mounting said housing means upon said base means, said mounting means normally being effective to maintain said housing means and said base means in a fixed relationship;
and wrench means, said wrench means being effective when connected to said mounting means to oscillate said housing means relative to said base means.

References Cited by the Examiner
UNITED STATES PATENTS 2,761,306 9/56 McNutt _____ 73—1
2,954,691 10/60 Fulcher _____ 73—1 X ISAAC LISANN, *Primary Examiner.*